Aug. 28, 1951  J. A. MORRISON  2,565,737
DUCT SLIP JOINT
Filed June 7, 1949

John A. Morrison
INVENTOR.

Reynolds & Beach
ATTORNEYS
BY Robert W. Beach

Patented Aug. 28, 1951

2,565,737

UNITED STATES PATENT OFFICE 2,565,737

DUCT SLIP JOINT

John A. Morrison, Seattle, Wash., assignor to Boeing Airplane Company, Seattle, Wash., a corporation of Delaware Application June 7, 1949, Serial No. 97,603

6 Claims. (Cl. 285—199)

This invention relates to an exhaust duct variable joint of the type intended primarily for aircraft installations, for example, in which the variable joint serves as a vibration-isolating connection between the exhaust duct and manifold of the engine. It will be evident, however, once its essential nature and purpose is understood, that the invention is not necessarily limited to that particular application.

Earlier forms of variable joints, particularly those of the slip type, frequently gave trouble because of gas leakage past a slip connection which was necessarily or deliberately made loose to prevent binding. This invention aims at overcoming the leakage difficulty by a novel means or mechanism which not only forms an effective slip joint connection of the self-sealing type, but one which has the further attribute of improving the mechanical properties or relative sliding action of the slip connection parts, so that dimensional discrepancies and wear can be tolerated to a greater degree than in the case of earlier forms of slip joints.

An exhaust duct variable joint used in the illustrative aircraft application should not only have over-all capacity for free relative slippage between cooperating parts of the joint, but flexibility for bending as well. Moreover, the various elements cooperating to afford free flexibility and slippage, should be compactly organized, light in weight and provide an integrated leak-proof connection readily installed and dependable in operation. General considerations entering into the design of an exhaust line variable joint for aircraft engine use are discussed with some particularity in the patent to Edward C. Wells, No. 2,242,604, May 20, 1941, in which the patentee therein discloses a self-sealing joint with emphasis upon the flexibility property thereof. Certain features of that disclosure are employed to advantage in the composite flexible and slip joint by which my present invention is herein illustratively described.

In this latter connection a further object of my invention is to achieve a self-sealing slip joint which is simple in form and construction, and, for general purposes, basically constructed in the outward form of a conventional joint in order to obviate changes in cooperating duct or joint parts and mountings, any or all of which may be conventional or embody selected improvements such as the Wells invention.

An important feature of the present invention resides in an exhaust duct self-sealing variable or slip joint comprising telescoping inner and outer tubular members, the inner of which is slitted generally endwise and provided with a conformable liner strip overlapping the slit at the inside wall of such member. Self-sealing action at the slip joint results preferably to a degree from inherent resilience of the slitted inner member, which, initially, is inserted in the outer tubular member by slightly contracting its slitted end to be received in such outer member. However, sealing between these parts is realized to an important degree by the effect of pressure of the exhaust gas itself in the duct joint, expanding the slitted inner member into uniform close contact with the wall of the cooperative outer member. Furthermore, to complete the effective seal, leakage through a slit opening is prevented by again effectively harnessing pressure of the exhaust gas inside the joint. In this case it is accomplished by means of an overlapping liner strip which, in effect, acts as an automatic flap valve pressed outwardly by gas pressure against the inside wall of the slitted member to cover the slit.

It is, therefore, obvious that the pressure of contact between the telescoping slip joint members, effecting a seal, is in large or substantial part the direct result of gas pressure, so that the tightness of the seal increases as gas pressure increases, and vice versa. This is as it should be, of course, for the tendency of the joint to leak is proportional to the pressure of gas. On the other hand, the pressure of contact between the telescoping members in a practical case will not be so great as to produce binding between them, either for relative rotation or endwise slippage, but will, in fact, provide a close uniform contact between such members, unaffected appreciably by wear or by extreme temperature-dimensional variations.

Likewise expansion or contraction of the slitted tubular inner member, such as that caused by temperature changes, does not impair the slit-sealing action of the flap or liner strip, because, as pointed out later herein, the latter is connected to the slitted member only on one side of a slit to permit relative sliding between their contacting surfaces when relative expansion or contraction occurs.

These and other features, objects and advantages of the invention and certain details of construction of a preferred form thereof will become evident from the following description based upon the accompanying drawings.

Figure 2:
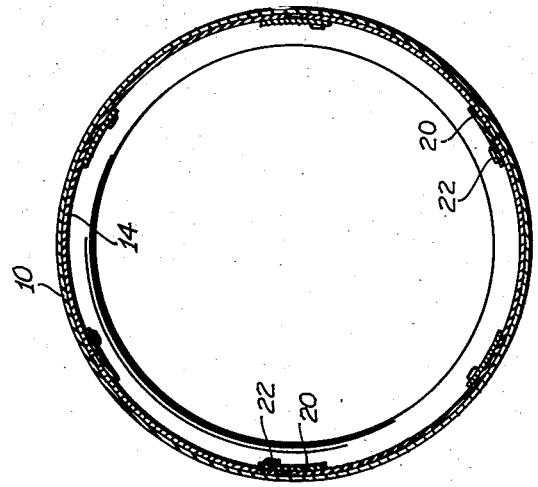
Figure 2 is a cross-sectional view of the slip joint taken on line 2—2 in Figure 1, at right angles to its longitudinal axis.
Figure 3:
Figure 3 is a face view of a liner strip element or flap employed therein.

Adopting generally the basic construction of a slip joint which is also made flexible for bending as disclosed in the patent to Wells, cited above, the preferred form of my improved flexible exhaust duct slip joint illustratively embodied therein includes a tubular outer member or sleeve 10 forming at one end the internal element of a hollow ball-and-socket flexible connection with the discharge end of the exhaust duct 12 of the engine. At its other end, outer tubular member 10 is open to receive a cooperating inner tubular member 14 which has a straight or cylindrical end portion of a diameter to telescope with the outer member. At its opposite end the inner member 14 forms the internal element of a hollow ball-and-socket flexible connection with an annular coupling member 16 which would be connected in a typical installation to the exhaust manifold of the engine or form a part thereof. The socket end portion of this latter member 16 has a maximum diameter slightly less than the inside diameter of the surrounding tubular member 10, so that it slides within such tubular outer member. The latter at its open or receiving end is flared slightly so that in the position of maximum overlap between the member 10 and the flexibly connected members 14 and 16, the coupling member 16 may still be swung to an appreciable angle of inclination relative to the longitudinal axis of the member 10 without interference from the end of the latter. Flaring the receiving end of member 10 also facilitates initially inserting the inner member 14.

Figure 1:
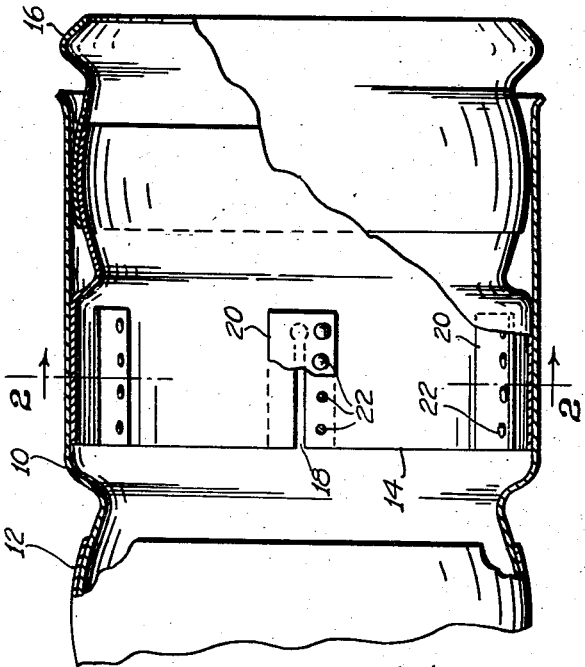
Figure 1 is a side view of my improved exhaust duct variable joint with parts broken away to reveal interior details.

It will be seen that a flexible exhaust duct slip joint basically of the form just described by reference to Figure 1, for example, constitutes a universal slip joint capable of interconnecting the exhaust duct and manifold of an engine while providing complete vibrational insulation between them. Moreover the connection can be made readily despite variations in angularity or relative offset between their respective axes, in the distance between them or in the rotated position of one relative to the other about the general axis of the joint. Such a flexible joint, therefore, not only facilitates the installation of the aircraft engine exhaust system by allowing for moderate variations in dimensions or relative locations of the interconnected parts, but during operation of the engine allows it to oscillate, as it will on its rubber shock mounts, without transmitting vibrational forces to the aircraft frame through the exhaust duct, the latter usually not being on shock mounts but rigidly connected to the aircraft frame.

Moreover, the illustrated basic type of flexible joint construction may conveniently, and as herein illustrated, incorporate features of the above-cited Wells patent, for example, such as by forming each of telescoping tubular members 10 and 14 of respectively larger diameter or cross-section in their respective regions of mutual sliding contact or overlap than in their respective oppositely extending ball-and-socket joint portions. As a result of these differences in cross-section the pressure of the gas in the joint acts to force its separable parts in opposite directions endwise and into firm contact with the exhaust manifold and exhaust duct, respectively. Also the ball-and-socket joint elements are wedged together to effect a seal from the same cause. This general principle and the advantages thereof are set forth in detail in the Wells patent.

My present contribution lies primarily in observing and overcoming a common difficulty with earlier types of exhaust duct slip joints, i. e. leakage of gas in objectionable amounts past their relatively slidable members corresponding, in the illustrated case, to the outer and inner tubular members 10 and 14, respectively. In the usual type of joint if these members, or ones corresponding thereto, were to fit together tightly enough to avoid gas leakage the joint would then frequently be excessively stiff and its proper functioning impaired. On the other hand any attempts to loosen the connection between these members to attain certain freedom of movement, would result in increased gas leakage from the joint. Lubrication is out of the question because of the extremely high operating temperatures.

In order to solve this problem, it is my invention to provide a slip joint having inner and outer tubular members telescoping together, in which the inner member is slitted generally endwise over a major portion of the length of its cylindrical portion contacting the outer member and carries a flexible liner strip or flap element overlapping the slit openings and pressed conformably against its inner wall by pressure of gas within the joint to effect a seal. As illustrated, the tubular inner member 14 has six axially extending slits 18 located at equal intervals around its periphery. These slits extend lengthwise of such member from its end adjacent to the exhaust stack member 12 over a major part of the length of its straight cylindrical portion contacting the inner wall of tubular outer member 10, as shown. The number of slits in the member 14 is not critical, but several equally spaced slits is considered preferable in order to attain the greatest degree of uniformity in its engagement of the inside wall of member 10.

Partly as a result of the inherent resilience of the metal of which the slitted tubular inner member 14 is formed, and, to an important extent, as a result of the outwardly acting pressure of gas within the joint, the several segments of this tubular member between its slits are urged uniformly radially outward into close contact with the inner wall of the outer tubular member 10 to effect a seal. The resulting pressure of contact between these members necessarily increases, therefore, with an increase in gas pressure. so that the seal between these slip joint elements improves with increased gas pressure. The forces producing this contact are relatively independent of dimensional discrepancies between the contacting members, as through the effects of wear, for example, so that the sliding properties and the effectiveness of the seal of this part of the joint remain unaltered. Sliding contact of the annular member 16 with the inside wall of the outer tubular member 10 at a location spaced endwise from the slitted portion mechanically stabilizes or strengthens the joint greatly against a tendency for the slitted portion of tubular inner member 14 to deform or collapse as a result of excessive bending forces applied externally as between members 10 and 14, and resisted only by the short length of contact between outer member 10 and member 14 weakened by the slits. Such bending becomes a distinct problem where, as in the illustrated case, the duct elements are at least 10 inches in diameter and of thin metal in the order of 0.06 inch to 0.08 inch. The root ends of the slits terminate in drilled holes or enlarged apertures as insurance against tearing of member 10 when stressed.

The self-sealing structure of the slip joint is completed by covering the generally longitudinal or endwise-extending slits to prevent flow of gas therethrough and out from between the telescoping members. This is accomplished by one or more flaps or liner strips 20 overlapping the slitted inside wall portions of the inner tubular member. Each such flap is connected to the member 14, as by spot welds or rivets 22, at only one side of a slit, so as to permit expansion of the tubular member 10. The countersunk heads of the rivets outside the member 10 are flush with its surface. In the illustrated case, six of these flaps 20 are employed, one to each slit opening. Formed of a flexible or conformable metal of a gauge which is thin relative to the gauge of the tubular member 14, such as 0.020 inch stainless steel, they function as automatic flap valves actuated by pressure of gas within the joint, and conform readily to the inside wall contour of tubular member 14 to effect a tight seal around the slit opening. If desired a single flap could be provided to cover more than one of the slit openings.

In operation, when pressure-gas flows through the flexible exhaust duct slip joint the liner strips or flaps 20 are urged by the gas pressure into sealing engagement with the slitted wall areas of tubular inner member 14 to prevent escape of gas in appreciable quantities out through the slit openings. Because of the manner in which the flaps are connected to the tubular member, this seal is preserved throughout relative expansion and contraction of the interconnected parts from whatever cause. Again the pressure of contact between the flaps and the slitted wall areas increases, as it should, with increase in gas-pressure to improve the seal.

As previously mentioned, the pressure of contact between the inner and outer tubular members 10 and 14 remains substantially constant, so that the freedom of the joint elements to function properly remains unchanged throughout variations in temperature affecting dimensions of these members. Gas pressure, and, to an extent, self resilience of member 14, provide a force effecting a seal between the parts of the slip joint, of a degree of tightness which is substantially unaffected by dimensional variations whether through wear, temperature change or otherwise. Hence reliance for satisfactory mechanical operation of the joint is placed, not heavily upon close precision in the dimensioning of the telescoping parts to provide the desired fit between them, but mainly upon the effect of the pressure of gas within the joint.

I claim as my invention:

1. A self-sealing slip joint for an exhaust duct or the like, comprising a round tubular outer member, a round tubular inner member telescoping within said tubular outer member for sliding relatively rotationally and endwise therein, said tubular inner member being slitted generally endwise to enable radial expansion thereof into close pressing engagement with said tubular outer member, and a liner strip member contacting and conformed to the inside wall of said tubular inner member, overlapping a slit opening therein and connected thereto at a circumferential location thereon to allow for expansion of said inner tubular member and relative circumferential sliding thereon of said liner strip member without disturbing the liner strip member's slit-overlapping contact therewith, the members cooperating mutually in such manner that gas pressure within the joint presses the slitted tubular inner member outward into sealing engagement with the tubular outer member, and the liner strip member outward into slit-sealing engagement with the tubular inner member.

2. A self-sealing slip joint for an exhaust duct or the like, comprising a tubular outer member, a tubular inner member telescoping within said tubular outer member for sliding relatively endwise therein, said tubular inner member being slitted generally endwise over a portion of its length to enable radial expansion thereof into pressing engagement with said tubular outer member, and a liner strip member contacting and conformed to the inside wall of said tubular inner member, overlapping a slit opening therein and connected thereto at a peripheral location thereon for allowing radial expansion of said inner tubular member and relative peripheral sliding thereon of said liner strip member without disturbing the liner strip member's slit-overlapping contact therewith, the members cooperating mutually in such manner that gas pressure within the joint presses the slitted tubular inner member outward into sealing engagement with the tubular outer member, and the liner strip member outward into slit-sealing engagement with the tubular inner member.

3. The self-sealing joint defined in claim 2, and universal joint means connected to the slitted tubular inner member and received slidably within the tubular outer member at a location spaced endwise thereof from the slitted portion of such inner member to stabilize and protect said slitted portion against external bending forces applied as between such inner and outer members.

4. The self-sealing slip joint defined in claim 2, wherein the tubular inner member is of relatively heavy gauge metal and the liner strip member is of relatively light gauge metal and flexible to enable conformation thereof to the inside wall of said tubular inner member, to effect a seal therewith by pressure of gas acting outward on such strip member throughout a substantial range of expansion and contraction of such tubular inner member.

5. A self-sealing slip joint for an exhaust duct or the like, comprising a tubular outer member, a tubular inner member having a straight cylindrical wall portion telescoping within said tubular outer member for sliding relatively endwise therein, said tubular inner member being slitted generally endwise over a major portion of the length of said straight wall portion at circumferentially spaced locations thereon, to enable radial expansion thereof into substantially uniform pressing contact with the inside wall of said tubular outer member, and a liner flap member overlapping each slit opening in said inner tubular member and, by pressure of gas acting outwardly on such flap member, closely engageable with the inside wall of such tubular member to effect a seal of a slit opening therein, while said slitted tubular inner member in turn is pressed radially outward by pressure of gas into sealing engagement with the tubular outer member.

6. The self-sealing slip joint defined in claim 5, wherein each slit opening in the tubular inner member is covered by a separate flap member of thin and flexible metal fastened to such tubular member only at one side of the slit covered, to enable expansion of said tubular inner member without disturbing the flap member's slit-overlapping engagement therewith.

JOHN A. MORRISON.

REFERENCES CITED

The following references are of record in the file of this patent:

UNITED STATES PATENTS

| Number | Name | Date |
|---|---|---|
| 611,442 | Vaughan | Sept. 27, 1898 |
| 2,494,659 | Huyton | Jan. 17, 1950 |